(12) United States Patent
McLeod et al.

(10) Patent No.: US 8,941,744 B2
(45) Date of Patent: Jan. 27, 2015

(54) IMAGE SENSORS FOR ESTABLISHING AN IMAGE SHARPNESS VALUE

(75) Inventors: Stuart McLeod, Lothian (GB); Ed Duncan, Gairloch Highland (GB)

(73) Assignee: STMicroelectronics (Research & Development) Limited, Marlow Bucks (GB)

( * ) Notice: Subject to any disclaimer, the term of this patent is extended or adjusted under 35 U.S.C. 154(b) by 1245 days.

(21) Appl. No.: 12/112,227

(22) Filed: Apr. 30, 2008

(65) Prior Publication Data

US 2008/0266406 A1 Oct. 30, 2008

(30) Foreign Application Priority Data

Apr. 30, 2007 (EP) ..................................... 07270022

(51) Int. Cl.
*H04N 5/228* (2006.01)
*H04N 5/232* (2006.01)

(52) U.S. Cl.
CPC ........ *H04N 5/23248* (2013.01); *H04N 5/23254* (2013.01)
USPC ..................................... 348/208.6; 348/222.1

(58) Field of Classification Search
USPC ........... 348/208.99, 208.1, 208.6, 208.5, 345, 348/352, 349, 362, 222.1, 221.1
See application file for complete search history.

(56) References Cited

U.S. PATENT DOCUMENTS

| | | | |
|---|---|---|---|
| 5,477,271 A | 12/1995 | Park | |
| 7,027,087 B2 * | 4/2006 | Nozaki et al. | ............. 348/231.99 |
| 7,492,392 B2 * | 2/2009 | Yokonuma | ................. 348/220.1 |
| 2003/0193610 A1 * | 10/2003 | Nozaki et al. | ................. 348/345 |
| 2005/0243180 A1 * | 11/2005 | Yokonuma | ................. 348/222.1 |
| 2006/0221223 A1 * | 10/2006 | Terada | ..................... 348/333.05 |
| 2006/0256396 A1 | 11/2006 | Ejima et al. | .................... 358/448 |
| 2006/0267858 A1 * | 11/2006 | Yun et al. | ....................... 345/1.1 |

FOREIGN PATENT DOCUMENTS

JP 2004236006 8/2004 ............. H04N 5/232

* cited by examiner

*Primary Examiner* — Ahmed A Berhan
(74) *Attorney, Agent, or Firm* — Allen, Dyer, Doppelt, Milbrath & Gilchrist, P.A.

(57) ABSTRACT

A method of compensating for camera shake includes reading a sequential series of images from an image sensing array, establishing a sharpness value for each of the sequential series of images, and performing an image selection based upon each sharpness value. The sharpness value is calculated for each image of the sequential series thereof during the reading.

27 Claims, 5 Drawing Sheets

IMAGE SENSORS FOR ESTABLISHING AN IMAGE SHARPNESS VALUE

FIELD OF THE INVENTION

This invention relates to improvements in or relating to image sensors, and, in particular, to a method of enhancing the quality of images produced by an image sensor by compensating for camera shake, and to signal processing circuitry and an image sensing system for carrying out the method.

BACKGROUND OF THE INVENTION

Image quality is understood in a general sense to refer to the degree of detail that can be discerned from an image, and the accuracy of reproduction of a scene. The quality of an image is assessed by measuring various factors, such as image contrast, image resolution, dynamic range and color rendering properties.

Another factor by which an image quality is assessed is image sharpness. A sharp image is one with well defined edges, showing high contrast and high resolution properties.

Degradation of image sharpness is known as blurring, and a blurred image is taken to be an image which does not display optimal sharpness characteristics. It is to be understood that no image will exhibit perfect sharpness characteristics, but for a given object imaged by a given image sensor there will be a certain maximum sharpness that can be achieved given the position of the object, the lighting conditions and the characteristics of the image sensor. A blurred image will be understood in general to mean any image that does not exhibit the maximum achievable sharpness in that sense. In practice, an image may be considered as "blurred" if its sharpness does not meet certain predefined criteria, which effectively define a quantified sharpness threshold that defines an acceptable sharpness for an image. The threshold can vary according to application and sensor.

Blurring can be caused by incorrect focus of incident light onto an image sensing array, arising from a non-optimal position and/or shape of lens with respect to an image sensing array due to incorrect manual setting of focus parameters or from errors in autofocus and edge detection algorithms.

Another source of blurring arises from undesired motion of the image sensor during image capture, as arises for example from motion of the human hand or in cases where the camera or its user is on an unstable surface. This problem is further exaggerated if an image is being shot with a long exposure time, for example in low light conditions. This source of blurring will hereafter be referred to as "camera shake" for ease of reference.

Various image stabilization techniques are known for addressing the problem of camera shake. One category involves the mechanical movement of a lens or prism, as controlled by motion sensors so as to reduce or eliminate the effects of camera shake. However, such systems add considerable complexity and can sometimes consume significant power.

It is also known to provide various forms of electronic image stabilization. One such technique involves the capture of a number of images, for example four, and then the raw data from the four images is analyzed and stitched together to form a composite image having an optimum sharpness. This technique yields good results, but requires a frame store, that is, a memory array that is large enough to store uncompressed image data of at least one complete image frame. Where a number of images are captured for comparison, the frame store memory must be large enough to store each of the uncompressed captured images, The use of a frame store adds considerably to system complexity, cost, power consumption and size. For some devices, such as high end digital still cameras, these disadvantages can be accepted. However for some devices these drawbacks are such that image stabilization cannot be contemplated. For example, an image sensor that is incorporated in a mobile telephone cannot typically incorporate such image stabilization techniques because manufacturing and industrial pressures to reduce form factor and camera module size mean the size of the image sensor circuit must be minimized where possible, and battery life performance requirements mean that the use of a frame store memory is not desirable.

Furthermore, the stitching algorithms are complex and require a large amount of digital logic to be implemented, bringing about similar disadvantages in terms of system complexity, cost, power consumption and size.

Therefore, there is a need for an image sensor that can account for camera shake such as without the need for a frame store and/or without the need for computationally complex stitching algorithms.

SUMMARY OF THE INVENTION

According to a first aspect of the invention, there is provided a method of compensating for camera shake comprising reading out a sequential series of images from an image sensing array, establishing a sharpness value for each of the images in the series, and performing an image selection on the basis of the sharpness values.

"Camera shake" encompasses all unwanted movement of a camera that occurs during an image capture event, that is, a command initiated by a user or system, the operation of an image sensing system in response to that command, and the provision by the image sensing system of an image.

Preferably, the image selection comprises selecting a single image, which is most preferably the image having an optimal sharpness value from among the images in the series. The selected image is then preferably stored in a memory means or circuitry of an image sensing system for presentation to a user as the image captured by the image sensing system.

Alternatively, the images can be ranked in order of sharpness value, and a plurality of images can be presented to a user in ranked order. Most preferably, the user then selects one or more of the presented images for permanent storage. The presented images can be displayed in a composite thumbnail view on a display screen associated with or forming part of an image sensing system.

The sharpness value for an image is preferably established by analyzing the frequency components of the image, wherein a high sharpness value corresponds to a high proportion of high frequency content in the image.

The sharpness value may be established from an analysis of a sub-portion of image data generated by the image sensing array. Preferably, the sharpness value for an image is calculated prior to the readout of that image being completed. The image selection is performed on the fly by writing image data into a buffer and controlling the contents of the buffer.

Once a new image is identified as comprising a sharpness value higher than a preceding image, the buffer is enabled to overwrite the previous image data with the new image data. An image compression step is performed prior to the writing of the image data into the buffer. The size of the compressed image provides a measure of the high frequency content.

The sharpness value is derived from the uncompressed image data. The sequential series of images comprise between five and fifteen images taken over a time period between 100 and 1000 milliseconds, and most preferably ten images taken over a period of 300-350 milliseconds.

According to a second aspect of the invention, there is provided a signal processing means or circuitry comprising means or circuitry for receiving a sequential series of images from an image sensing array, controller means or circuitry for establishing a sharpness value for each of the images in the series, and output means or circuitry for outputting one or more of the images, wherein the sequence of images are those received during a single image capture event.

The controller means or circuitry comprises image selection means or circuitry for selecting a single image from the series to be output, which is most preferably the image identified as having an optimal sharpness value from among the images in the series. Alternatively, the controller means or circuitry comprises ranking means or circuitry for associating a sharpness value with each image and defining a rank order, and the output means or circuitry outputs the entire series of images.

The means or circuitry for receiving a sequential series of images comprises a memory means or circuitry, which most preferably comprises a buffer for storage of part of an image. The signal processing means or circuitry is provided as a co-processor operable with an image sensing array. Alternatively, the signal processing means or circuitry is provided on the same chip as an image sensing array.

According to a third aspect of the invention, there is provided an image sensing system which can compensate for camera shake, comprising an image sensing array, a signal processing means or circuitry according to the second aspect, and a baseband processor arranged to receive the image or images output from the signal processing means or circuitry.

The baseband processor is arranged to initiate a request for an image or a series of images. The baseband processor comprises a controller that ranks the series of images in terms of sharpness. The baseband processor comprises a controller that stores only the sharpest image from the sequence.

According to further aspects the invention provides for any of a digital still camera, a camera for use with a mobile phone, a webcam, an optical mouse, and a barcode reader comprising a signal processing means or circuitry of the second aspect, any of which may be incorporated within the image sensing system of the third aspect.

DETAILED DESCRIPTION OF THE PREFERRED EMBODIMENTS

The figures and text of this application describe a method and system that enable, for a given image capture event, the taking of a rapid series of images, and, performance of an image selection on the basis of the relative sharpness of the images. In analyzing a rapid series of images taken with a hand-held camera, it has been established that the involuntary hand motion of a person follows a typical pattern within which there may be short periods of approximately zero motion. Thus, by taking a rapid series of images and examining these for sharpness, there is a high probability that an image without little or no camera motion may be found. It is believed that good results may be achieved by taking ten or so images at a rate of 30 frames per second, that is ten frames over a period of ⅓ second. However, it is to be appreciated that the approach is not limited to a particular number of images or particular frame rate. The appropriate number of images and frame rate can be chosen according to the device in which the imaging system is to be incorporated, and according to exposure, light conditions and so on and so forth.

Figure 1:
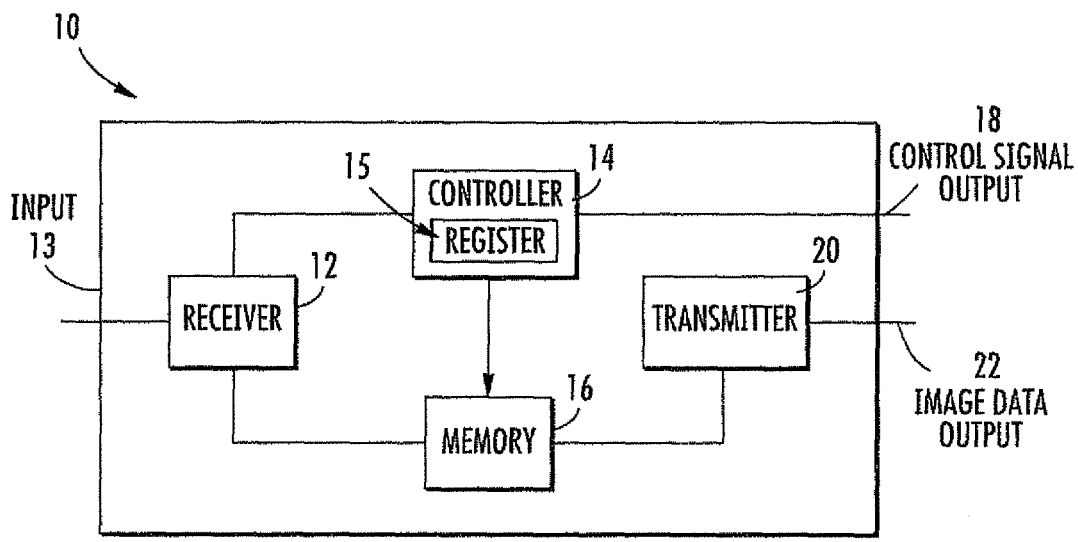
FIG. 1 is a block diagram illustrating one embodiment in accordance with the invention.

Referring to FIG. 1, a signal processing means or circuitry 10 comprises a receiver 12 for communication with an image sensing array, which provides image data at input 13. The received data is analyzed by a controller 14 and is stored in a memory 16 as will be described in more detail later. The receiver 12 and the memory 16 together form a means or circuitry for receiving a sequential series of images from an image sensing array.

The controller 14 is in communication with the memory 16 to control memory read and write operations. The controller 14 can also be in communication with an outside processor (not shown) via output 18 for the transmission of control signals. A transmitter 20 is provided to transmit image data from the processing means or circuitry 10 via output 22, as will be discussed in more detail below.

Figure 2:
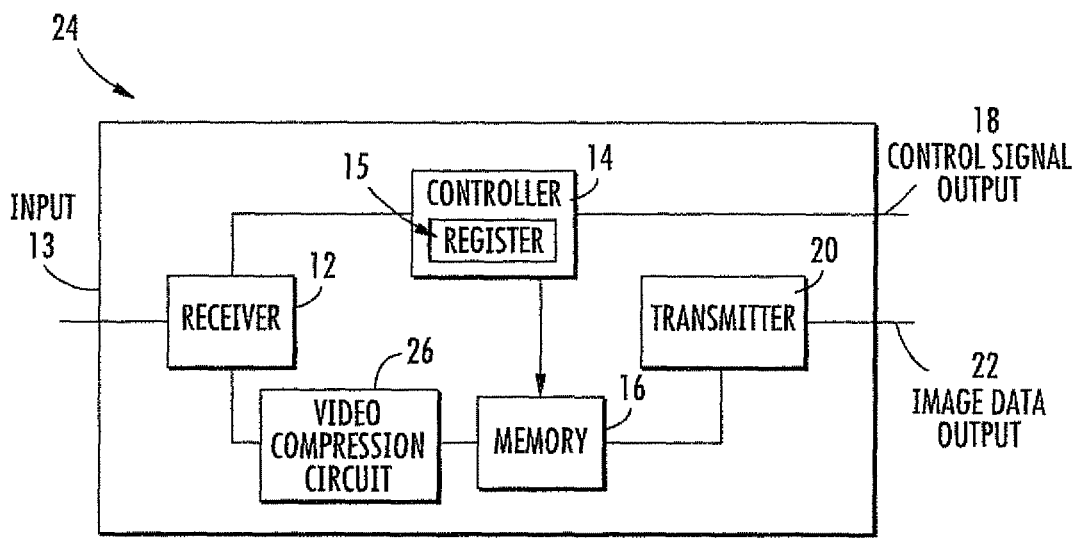
FIG. 2 is a block diagram illustrating a variation of the embodiment shown in FIG. 1.

FIG. 2 shows a modification of the embodiment shown in FIG. 1, therefore like reference numerals are used to describe similar components. The modified signal processing means or circuitry 24 comprises a video compression circuit 26 interposed between the receiver 12 and the buffer 16 which acts as an image compression means or circuitry. Typically JPEG compression may be applied although any other type of image compression may be chosen.

Figure 3:
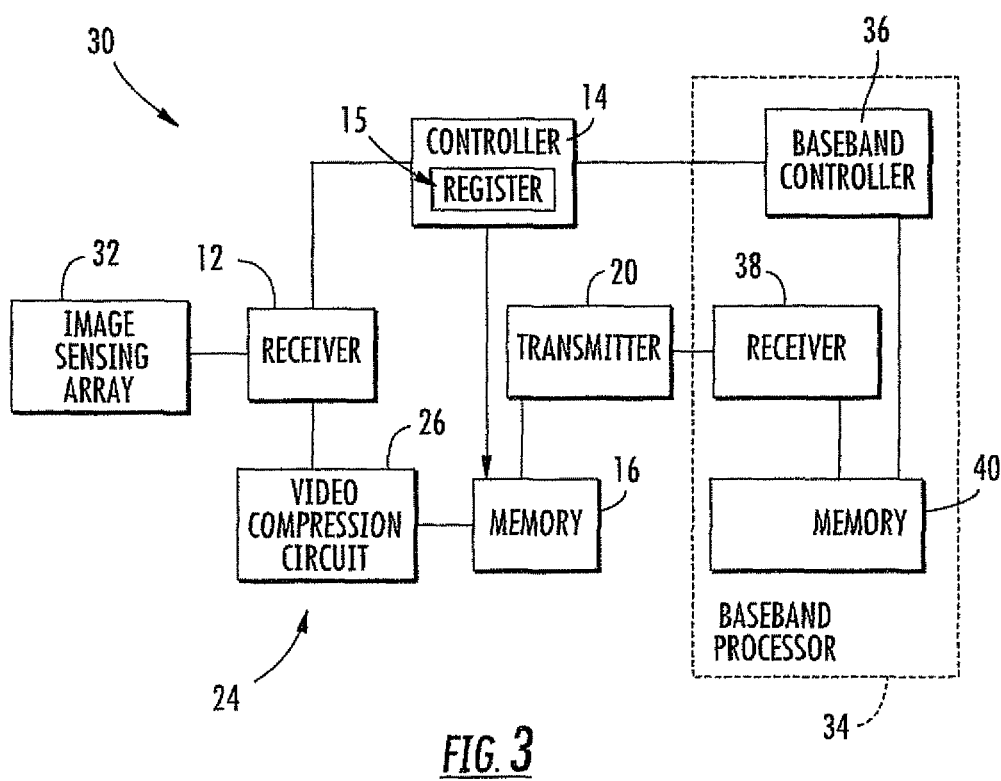
FIG. 3 shows an image sensing system comprising the signal processing means or circuitry shown in FIG. 2.

FIG. 3 shows an image sensing system 30 comprising the signal processing means or circuitry 24 of FIG. 2 in combination with an image sensing array 32 and a baseband processor 34 (the baseband processor is identified by the hatched lines). The signal processing means or circuitry 24 is shown as being interposed between the image sensing array 32 and baseband processor 34, but other physical or logical arrangements can be implemented.

The image sensing array includes an array of light sensitive pixels and associated readout electronics for generating image signals representative of the intensity of light that falls across the array. The array can be formed by any suitable processing technology, for example CMOS or a CCD, and can have any type of architecture.

The baseband processor 34 comprises a baseband controller 36 in communication with the controller 14 of the signal processing means or circuitry 24, a receiver 38 for receiving the signals transmitted by the transmitter 20 of the signal processing means or circuitry 24, and a memory 40 for storage of images and other data.

The signal processing means or circuitry 24 may be provided as a separate co-processor which sits along the image sensing array 32, that is, the signal processing means or circuitry 24 may be formed as a dedicated integrated circuit. However as an alternative, the image sensing array 32 and signal processing means or circuitry 24 may be formed as a signal integrated circuit.

The controller 14 of the signal processing means or circuitry 10, 24 processes image data to derive a sharpness value for each of the successive images. The sharpness value is calculated by examining the frequency distribution of data in the overall image. The existence of high frequency variations of intensity is taken to be indicative of a high level of detail in the image.

The determination of a sharpness value for an image does not require that the entire array of data is analyzed. The analysis and evaluation of a sharpness value can be made based upon a sub portion of the array. This enables an "on-the-fly" establishment of a sharpness value, wherein a sharpness value is calculated while the image sensing array is being read out.

The controller 14 comprises a register 15 for storing sharpness values. Within an image sensing device incorporating the image sensing system 30 of FIG. 3, the baseband processor 34 governs the initiation of a request for an image to be captured. There are two main modes of image capture, each involving an image selection on the basis of established sharpness values.

A first mode of image capture will now be described with reference to the architecture shown in FIG. 4, which illustrates some further optional implementation details. Again, the reference numerals will be retained from previous figures where applicable.

Figure 4:
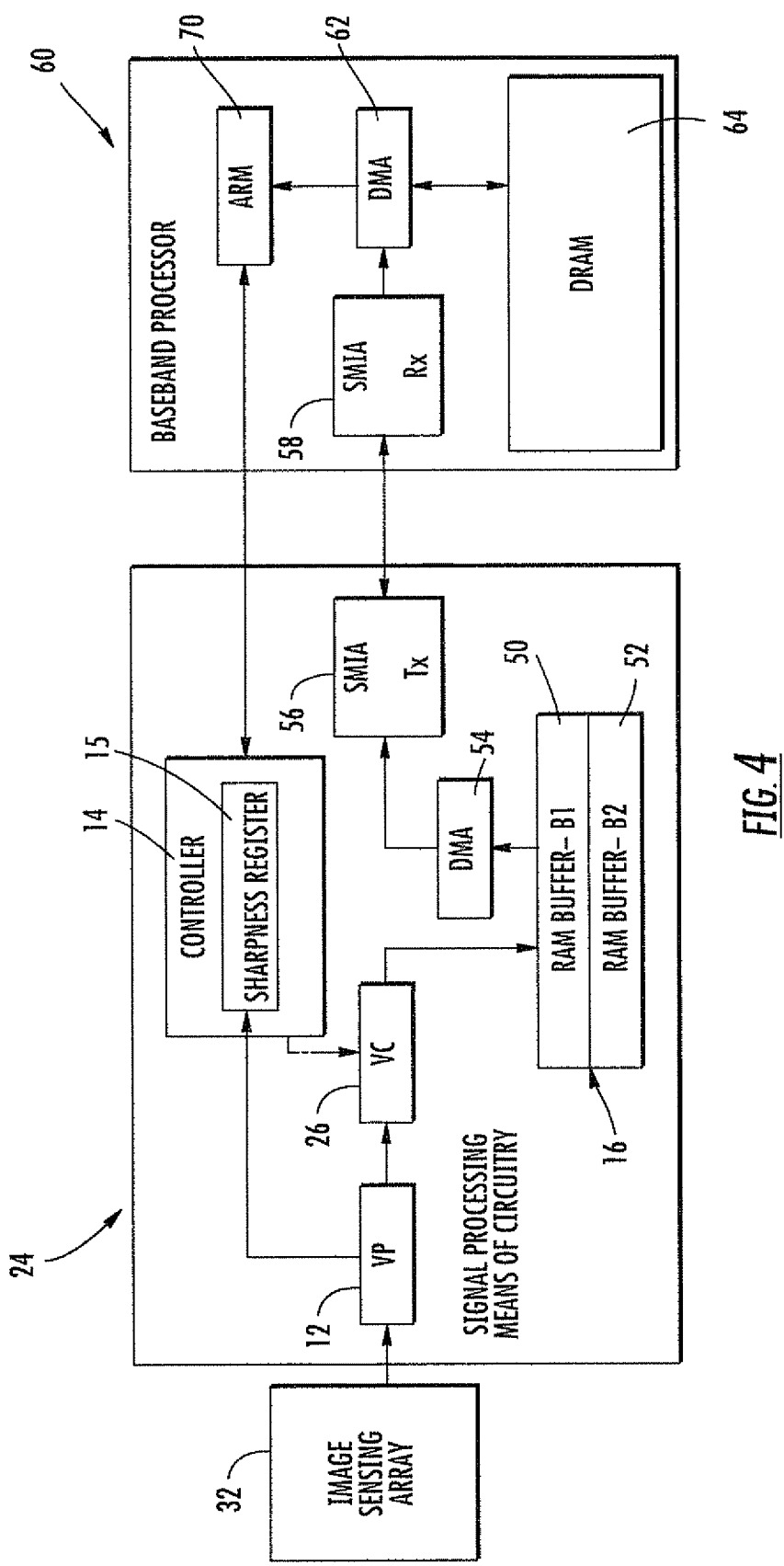
FIGS. 4 to 6 show further versions of image sensing system which illustrate selected alternative implementation details, in accordance with the invention.

In a mode of image capture that is enabled by the system of FIG. 4, the baseband 60 requests a single frame from the signal processing means or circuitry 24, in response to an image capture request initiated by a user or by other means or circuitry such as an automated control system. An image selection is then performed by the signal processing means or circuitry 24 to provide a chosen image to the baseband 60, selected from a series of images.

The signal processing means or circuitry 24 starts writing data from the image sensing array 32 into a first buffer 50 of a memory 16. Simultaneously, the controller 14 gathers statistics from the incoming image data in order to analyze the frequency variation of data across the array. When the buffer is filled up to a predetermined point, the controller 14 then calculates a sharpness value on the basis of the statistics it has gathered and writes it to the sharpness register 15. The first frame in the sequence may be stored in the first buffer 50, and then the second frame in the sequence may be stored in the second buffer 52. The controller then compares the sharpness values of the first and second images, and identifies one of the memory buffers 50, 52 as holding the least sharp image. The memory buffer that comprises the least sharp image is then selected and is overwritten with the image data from the next image in the sequence. Then the two sharpness values of the images in the buffers are compared once more, and the memory buffer that then comprises the least sharp image is selected to be overwritten by the next image. At the end of the sequence, the memory buffer that contains the sharpest image is then selected for transmittal to the baseband 60. This image is the sharpest of the sequence.

This process therefore accounts for blurring in the image caused by camera shake in that the best possible image from the sequence is selected. It has been realized that given the rapid sequence of images there may be at least one image where there is relatively little effect from the hand motion of a typical user.

It is usual, though not essential, for compression to be used. For this purpose, a video compression circuit 26 can be interposed between the receiver 12 and the buffer 16 which applies, for example, JPEG compression. This means that only the compressed image needs to be stored in the buffer 16 so that expensive frame store memories and associated computational stitching algorithms are not required.

For this implementation each buffer typically has to be of sufficient size to store one compressed image, although in a modification a single buffer that is less than twice the size of a buffer that can hold a full compressed image can be provided. The size of such a buffer depends on the chosen predetermined point at which the controller is set to assign a sharpness value. Generally, if the predetermined point is 1/n of a full buffer size (i.e. the size required to store one compressed image), then the single buffer may advantageously be of the size used to store (1+1/n) entire compressed images. When a given image in the sequence has a sharpness assigned to it, the controller 14 compares the newly calculated sharpness with the previously calculated sharpness and if the new sharpness is greater, then the remaining data from that image can overwrite the data from the previous image, but if the new sharpness is smaller, then the remaining data from that image is ignored.

It is known that for images taken outdoors, the top half is generally blue sky (or grey cloud if taken in Scotland) and thus does not hold a lot of high frequency data. However, this data is also highly compressed by JPEG and other compression algorithms and so the chosen predetermined point at which the controller is set to assign a sharpness value will usually be consistently effective for different types of images, as it is expressed as a percentage of the memory that is taken up.

In the embodiment of FIG. 4, the transmittal of the sharpest image to the baseband 60 is achieved via a direct memory access (DMA) component 54 in communication with a SMIA compliant transmitter 56. SMIA refers to the Standard Mobile Imaging Architecture that defines specifications for functionality, mechanics, characterization, interface and reliability for communication between image sensor components defines a compact camera port (CCP) specification, of which the latest version at the time of writing is known as CCP2. The SMIA transmitter 56 sends the selected sharpest image to a corresponding SMIA receiver 58 of the baseband processor 60, this is then transmitted again optionally by direct memory access 62 to a memory 64 for storage.

In a further optional embodiment, the receiver 12, controller 14 and memory 16 can be in continuous operation, and the series of images is chosen to be a sequence of images from both before and after the image capture request. This accounts for delays in human reaction time or other inaccuracies in the timing of an image capture request for the capture of a given image.

In principle any number of frames can be captured in the series, but, as an example, the sequential series of images may comprise between five and fifteen images taken over a time period between 100 and 1000 milliseconds. A further example option selected from these ranges would be to take ten images over a period of 300-350 milliseconds.

A second mode of image capture will now be described with reference to the architecture shown in FIG. 5, which illustrates some further optional implementation details. Again, the reference numerals will be retained from previous figures where applicable.

In this mode the baseband processor 68 requests a sequence of frames to be transmitted by the signal processing means or circuitry. An image selection is performed at the baseband 68 which makes use of sharpness values calculated by the signal processing means or circuitry 24.

As before, the sharpness value of each frame is written to a sharpness register 15 using the controller 14, which is triggered when the buffer is filled up to a predetermined point.

Figure 5:
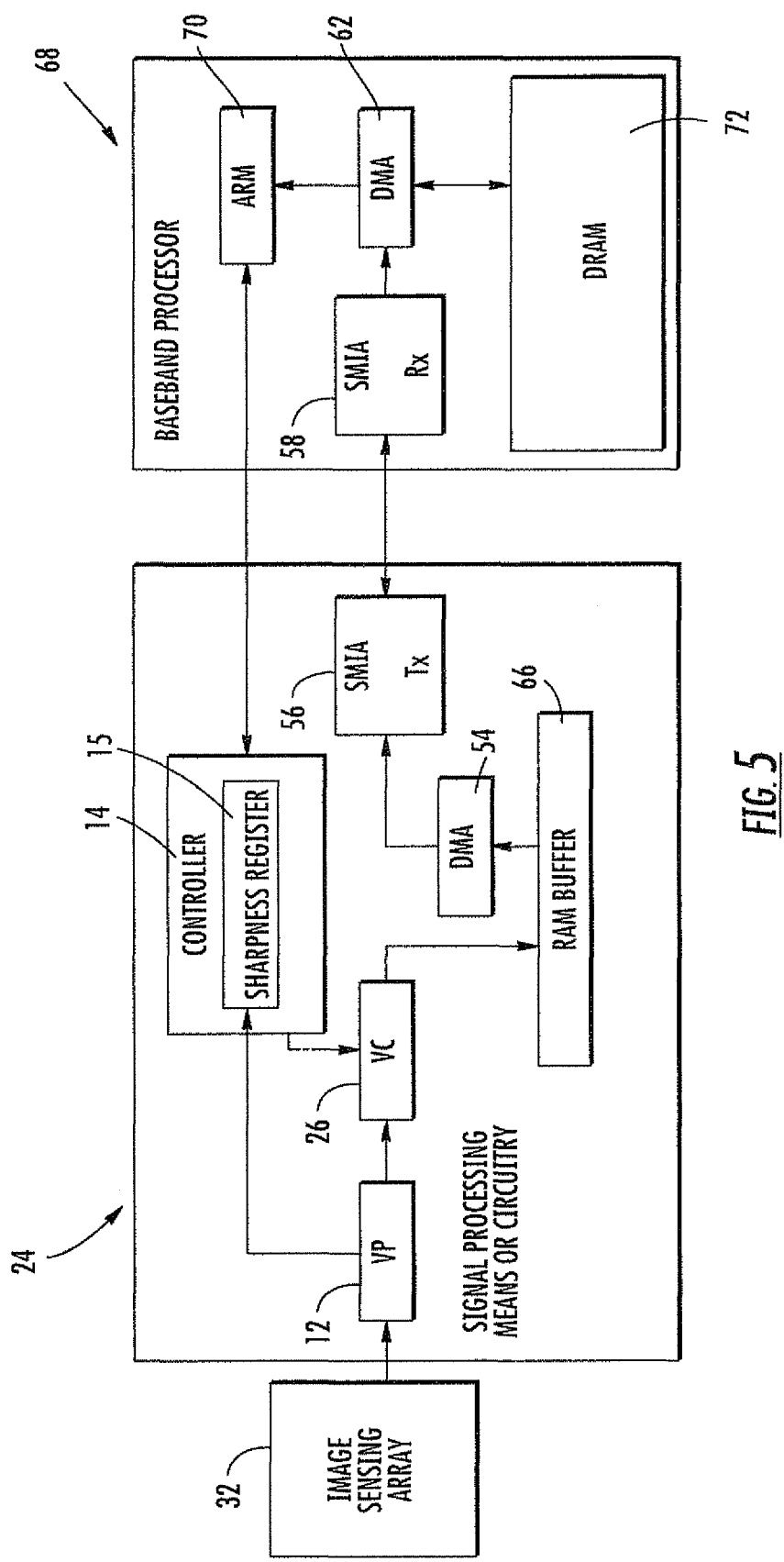

However in the embodiment shown in FIG. 5, the images are each sent to the baseband 68 as soon as the sharpness value has been calculated.

This means that the buffer needs to be only of the size to store 1/n of a compressed image, where the denominator "n" defines the predetermined point at which an image sharpness value is calculated. The choice of n is arbitrary, but it does need to be small enough to give an accurate measure of sharpness, and in particular a measure that may vary between successive images. As an example, a three megapixel frame of image data may typically be compressed by a factor of ten by JPEG compression to a nominal size of 600 kB, and n could typically be chosen to be 2.3, i.e. it is judged that enough information is present to give an accurate sharpness reading after roughly 40% of the image has been processed. For that case the size of the memory buffer required would be 256 kB.

The actual value of "n" may vary from image to image, as the stored size of an image depends on the amount of detail present in the imaged scene, however the value of the buffer (256 kB) is chosen based on the value of n being 4 for a particular image, and the size of 256 kB is acceptable for use for different images.

The baseband processor 68 comprises a processor controller 70 which then stores the images in memory 72 with their associated sharpness values. The processor controller 70 can be further configured to rank the images in terms of their sharpness and to display them to a user in a ranked order. The display can make use of thumbnail icons on a display screen, but the order of presentation or other graphical indications makes it clear to the user which image is the sharpest. The user can then select the sharpest image for permanent storage in the memory 72, and the others can be deleted.

Alternatively, the user can select a different image if it is the one that best represents the scene he was trying to capture. For example, a user may wish to photograph a fast moving object, and he may wish to select the image that corresponds to the position of the object being in the center of the frame rather than using the sharpness as an absolute criteria. Such a method is used for example in the BestPic™ system marketed by Sony Ericsson, in which the user is provided with the possibility of selecting an image from a sequence. However if the user wants to select the sharpest image, he has no objective way of knowing which image is sharpest. Furthermore, images have to be displayed side by side in a thumbnail view for comparison by the user, and this reduction in displayed resolution makes it difficult to make a subjective judgement as to which image is the sharpest.

Figure 6:
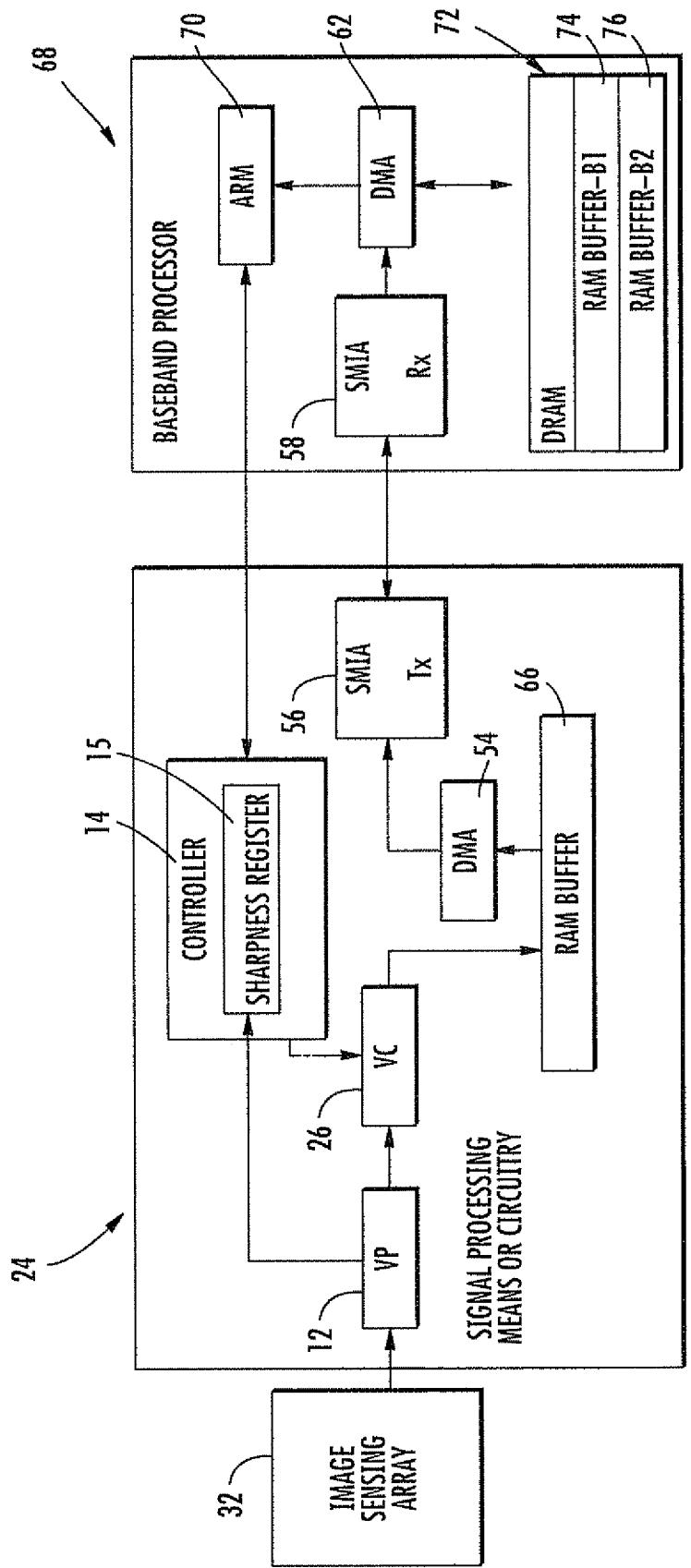

A modification to the image sensing system of FIG. 5 is shown in FIG. 6. In this embodiment, the image selection is again performed at the baseband processor 68, making use of the sharpness values established by the signal processing means or circuitry.

However, rather than storing the entire sequence of images in the memory 72, the baseband processor 68 performs an image selection in a similar manner to the selection performed by the signal processing means or circuitry 24 as shown in FIG. 4. The memory 72 comprises a first buffer 74 and second buffer 76. The processor controller 70 keeps track of which buffer 74,76 contains the sharpest image as the sequence proceeds, and writes the incoming image into the bank that currently contains the least sharp image. At the end of the sequence it then outputs or permanently stores the sharpest image.

As compared with the system shown in FIG. 4, the system of FIG. 6 reduces the size of the memory 16 that is required as part of the signal processing means or circuitry 24, and as compared with the system shown in FIG. 5, the system of FIG. 6 reduces the amount of memory required by the baseband to process incoming images.

It is to be appreciated that the above described methods for compensating for camera shake can be used in combination with other image processing methods which can be performed by an image sensing system. For example, a focus can first be set, either manually or by an automated autofocus algorithm, before the camera shake compensation is applied. That is to say, in response to an image capture request an image sensing system can apply an autofocus algorithm to set the correct lens position and thereafter apply any of the above methods for camera shake compensation.

It is to be appreciated that the various image sensing systems and signal processing means or circuitry that are described above can be incorporated into a wide variety of devices and serve a wide variety of end uses, for example as a digital still camera, a camera for use with a mobile phone, a webcam, an optical mouse, a barcode reader. A person skilled in the art is familiar with the constructions of each of these devices and does not need any further teaching with regard to specific implementation details.

Various other improvements and modifications may be made to the above without departing from the scope of the present invention.

That which is claimed:

1. A method of compensating for camera shake comprising:
   reading a sequential series of images from an image sensing array, using a controller;
   storing image data from the image sensor array into a buffer;
   calculating statistics on the image data, using the controller, to analyze a frequency variation across the image sensor array;
   after the buffer is filled to a predetermined point, establishing a sharpness value for each image of the sequential series thereof based on the calculated statistics, using the controller; and
   performing an image selection based upon each sharpness value, using the controller;
   the sharpness value being calculated for each image during the reading.

2. The method of claim 1, wherein the image selection comprises selecting a single image.

3. The method of claim 2, wherein the single image is an image of the sequential series thereof having an optimal sharpness value.

4. The method of claim 1, wherein a result of the image selection is stored in a memory for presentation to a user.

5. The method of claim 1, wherein each image of sequential series thereof are ranked in order of their respective sharpness value and a plurality of images are presented to a user in ranked order.

6. The method of claim 5, wherein one or more of the plurality of images is selectable for permanent storage.

7. The method of claim 5, wherein the plurality of images are displayed in a composite thumbnail view on a display screen.

8. The method of claim 1, wherein a high sharpness value corresponds to a high proportion of high frequency content in the image.

9. The method of claim 1, wherein the image selection is performed by writing image data into a buffer and controlling contents of the buffer.

10. The method of claim 9, wherein once a new image is identified as having a sharpness value higher than a preceding image, the buffer is enabled to overwrite previous image data with new image data.

11. The method of claim 9, wherein an image compression step is performed prior to the writing image data into the buffer.

12. The method of claim 11, wherein a measure of a high frequency content is calculated based on a size of the image after the image compression step.

13. The method of claim 1, wherein the sequential series of images comprises between five and fifteen images taken over a time period between 100 and 1000 milliseconds.

14. The method of claim 1, wherein the sequential series of images comprises ten images taken over a period of 300-350 milliseconds.

15. An electronic device comprising:
receiver circuitry to receive a sequential series of images from an image sensing array during a single image capture event;
a buffer to store image data from the image sensor array;
a controller to
calculate statistics on the image data to analyze a frequency variation across the image sensor array, and
after the buffer is filled to a predetermined point, establish a sharpness value for each image of the sequential series thereof based on the calculated statistics, the sharpness value being established for each image during the single image capture event; and
output circuitry to output one or more images of the sequential series thereof.

16. The electronic device of claim 15, wherein said controller comprises image selection circuitry to select a single image from the sequential series thereof to be output.

17. The electronic device of claim 16, wherein said image selection circuitry selects the single image as an image identified as having an optimal sharpness value from among the sequential series thereof.

18. The electronic device of claim 15, wherein said controller comprises ranking circuitry to associate the sharpness value with each image of the sequential series thereof and to define a rank order, and wherein said output circuitry outputs all of the sequential series of images.

19. The electronic device of claim 15, wherein said receiver circuitry comprises a buffer to store part of an image.

20. The electronic device of claim 15, wherein said receiver circuitry, said controller, and said output circuitry define a co-processor operable with the image sensing array.

21. The electronic device of claim 15, wherein said receiver circuitry, said controller, and said output circuitry are integrated on a same chip as the image sensing array.

22. The electronic device of claim 15, wherein said electronic device comprises one of a digital still camera, a camera for use with a mobile phone, a mobile phone, a webcam, an optical mouse, and a barcode reader.

23. An electronic device, comprising:
an image sensing array;
a signal processing apparatus comprising
receiver circuitry to receive a sequential series of images from said image sensing array during a single image capture event,
a buffer to store image data from the image sensor array,
a controller to
calculate statistics on the image data to analyze a frequency variation across the image sensor array, and
after the buffer is filled to a predetermined point, establish a sharpness value for each image of the sequential series thereof based on the calculated statistics, the sharpness value being established for each image during the single image capture event, and
output circuitry to output one or more images of the sequential series thereof; and
a baseband processor arranged to receive an output from a signal processing apparatus.

24. The electronic device of claim 23, wherein said baseband processor is configured to initiate a request for an image or a series of images.

25. The electronic device of claim 24, wherein said baseband processor further comprises a baseband controller to rank the sequential series of images in terms of sharpness.

26. The electronic device of claim 25, wherein said baseband processor comprises a baseband controller to store a sharpest image of the sequential series thereof.

27. The electronic device of claim 23, wherein said electronic device comprises one of a digital still camera, a camera for use with a mobile phone, a mobile phone, a webcam, an optical mouse, and a barcode reader.

* * * * *